United States Patent [19]

Namiki et al.

[11] Patent Number: 5,366,835
[45] Date of Patent: Nov. 22, 1994

[54] GRADUATION REPRODUCTION IN OPTICAL RECORDING

[75] Inventors: Kazunori Namiki, Yokosuka; Takashi Yamamura, Yokohama, both of Japan

[73] Assignee: Victor Company of Japan, Ltd., Yokohama, Japan

[21] Appl. No.: 16,369

[22] Filed: Feb. 11, 1993

[30] Foreign Application Priority Data

Feb. 14, 1992 [JP] Japan .................................. 4-061304

[51] Int. Cl.⁵ .................................................. G03C 5/00
[52] U.S. Cl. ........................................ 430/30; 358/298
[58] Field of Search ............................ 430/30; 358/298

[56] References Cited

U.S. PATENT DOCUMENTS 4,486,788  12/1984  Yamada ............................. 358/298

FOREIGN PATENT DOCUMENTS 63-212273  9/1988  Japan .

Primary Examiner—Steve Rosasco

Attorney, Agent, or Firm—Lowe, Price, LeBlanc & Becker

[57] ABSTRACT

A graduation reproduction method in performing the halftone recording due to screen percentage by a light spot of a light beam with the light beam being intensity-modulated on the basis of digital image data in accordance with a binary recording technique. An illumination time value is reduced with respect to the normal illumination time value determined under a recording condition set to record a minimum recording dot on the recording medium. The reduced illumination time is set as a unit illumination time at the time of the recording of the halftone and the secondary scanning speed is reduced in correspondence with the rate of reduction of the unit illumination time relative to the normal illumination time value. Further, in the case that the recording operation is the screen percentage to be effected by the light spot only for the unit illumination time, the exposure is arranged so as not to be effected by the light spot, or arranged to be effected for the normal illumination time value.

8 Claims, 16 Drawing Sheets

LIGHT SPOT

MESH SPOT

MESH SPOT

MESH SPOT

GRADUATION REPRODUCTION IN OPTICAL RECORDING

BACKGROUND OF THE INVENTION

The present invention relates to a graduation reproduction in an optical recording for image processing applicable to information-related field, printing-related field and others.

The tone reproducibility is an important factor in making a high-quality image, and hence, various devices to improve the tone reproducibility have been proposed in relation to the case that the image processing in optical recording/reproduction is effected by analog image signals and the case that the image processing in optical recording/reproduction is effected by digital image data. One known approach is that, as disclosed in the Japanese Patent Provisional Publication No. 63-212273, when a unit area (for example, whose side has a length which is 0.67 to 1.33 times the diameter of light spot for the exposure) due to division of a mesh spot (halftone cell) in a matrix form is used as the spatial and quantized unit, the unit area is vertically and horizontally divided into a plurality of small areas whereby the exposure for information recording is performed in units of a distance shorter than the diameter of the exposure light spot so as to improve the recording density and the tone reproducibility. There is a problem which arises with such a prior art technique where the tone is made by recording dots obtained by the exposure in units of the distance shorter than the light spot diameter, however, in that the exposure light source is required to be stably and nonlinearly intensity-modulated for allowing linear reproduction of the tone in the mesh spot.

SUMMARY OF THE INVENTION

It is therefore an object of the present invention to provide a graduation reproduction method which is capable of reproducing an image with a high resolution and intermediate multi-tones without changing the arrangement of optical systems.

According to this invention, for performing the halftone recording due to the screen percentage (area toning) by a light spot of a light beam with the light beam being intensity-modulated on the basis of digital image data in accordance with the binary recording technique and the main scanning operation and the secondary scanning operation being effected by the relative displacement between the light spot of the light beam and a member to which the light spot is projected, an illumination time value reduced with respect to the normal illumination time value determined under a recording condition set to record a minimum recording dot on a recording medium is set as a unit of the illumination time and this unit illumination time value is used as a unit illumination time at the time of the recording of the halftone due to the screen percentage and the secondary scanning speed is reduced in correspondence with the rate of reduction of the unit illumination time relative to the normal illumination time value. Further, in the case that the recording operation is the screen percentage to be effected by the light spot only for the unit illumination time, the exposure is arranged so as not to be performed by the light spot of the light beam, or the exposure is effected by the light spot for the normal illumination time.

Moreover, according to this invention, similarly, an illumination time value reduced to a predetermined state with respect to the normal illumination time value determined under a recording condition set to record the minimum recording dot on the recording medium is set as a unit of the illumination time and this unit illumination time is used as a unit illumination time at the time of the recording of the halftone due to the screen percentage and the secondary scanning speed is reduced in correspondence with the rate of reduction of the unit illumination time relative to the normal illumination time value, and in the case that the recording operation is the screen percentage to be effected by the light spot only for the unit illumination time, the exposure is performed with the light spot of the light beam for the normal illumination time value determined under the recording condition taken when recording the minimum recording dot on the recording medium, and in the case of the graduation expression due to the halftone cell in the development where the portion which has not been exposed by the light spot is developed as an image, the output interval of the minimum recording dots is widened so as to output a screen percentage exceeding the screen percentage determined in correspondence with the above-mentioned minimum recording dot, and in the case of the graduation expression due to the mesh spot in the development where the portion which has been exposed by the light spot is developed as an image, the output interval is widened so as to output a screen percentage below the screen percentage determined in correspondence with the minimum recording dot.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
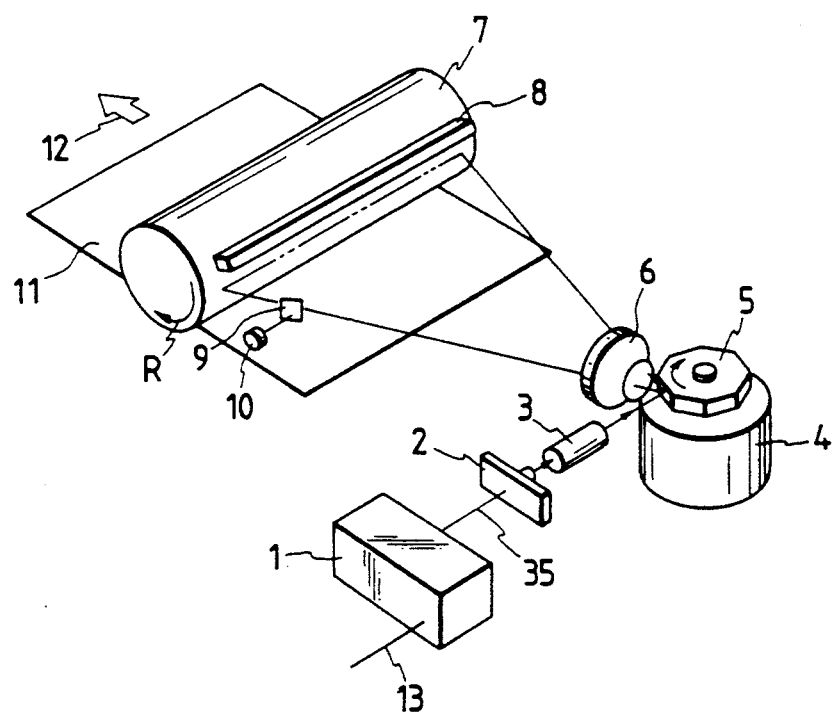
FIG. 1 is a perspective view showing an arrangement of an optical recording apparatus to which a graduation reproduction method according to this invention is applicable.

FIG. 1 shows an arrangement of an optical recording apparatus (a laser printer) based upon a graduation reproduction method in the optical recording according to this invention. In FIG. 1, the laser printer comprises a laser drive section 1 which is responsive to image data supplied from an image data synchronous output circuit (designated at numeral 19 in FIG. 2) through a line 13 and a semiconductor laser 2 which is ON-and-OFF-controlled (flashing-controlled) in accordance with a laser drive signal supplied from the laser drive section 1 through a line 35. Laser light emitted from the semiconductor laser 2 is collimated by a collimator lens 3 and then incident on a polygon mirror wheel 5. This rotating mirror wheel 5 is rotated at a predetermined speed by means of a motor 4 whereby the laser light incident on the rotating mirror wheel 5 is deflected and outputted in predetermined directions so as to be incident on a condensing lens 6. This condensing lens 6 condenses the incident laser light to form a microscopic light spot on a photosensitive drum 7. This photosensitive drum 7 is rotated by a rotational drive mechanism (not shown) in a direction indicated by an arrow R so as to perform the secondary scanning in a direction perpendicular to the main scanning direction (the deflecting direction of the laser light due to the rotating mirror wheel 5). Since the photosensitive drum 7 is previously charged evenly by a charger (colotron, scolotron) 8, the surface potential of the photosensitive drum 7 varies in response to the illumination of the laser light, thus forming a latent image corresponding to the recording image thereon. In a development section (not shown), a toner is attached onto the photosensitive drum 7 in accordance with the normal development or reversal development and transferred onto a recording sheet 11 moving in a direction indicated by an arrow 12 so as to form a toner image after heated and fixed. After the transferring, the excessive toner on the photosensitive drum 7 is removed in a cleaning section (not shown). In FIG. 1, numeral 9 designates a reflecting mirror and denotes a sensor to determine the timing of the horizontal synchronizing signal. Here, this graduation reproduction method is also applicable to a different recording apparatus in which a recording image is directly recorded on a photosensitive recording medium made of silver salt photosensitive material, titanium oxide, zinc oxide or others.

Figure 2:
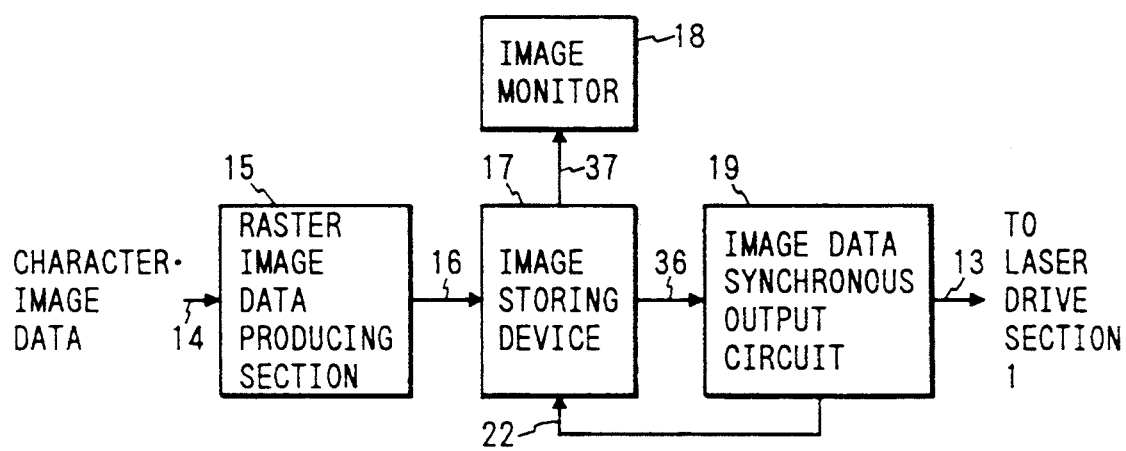
FIG. 2 is a block diagram showing a circuit arrangement of the FIG. 1 optical recording apparatus.
Figure 3:
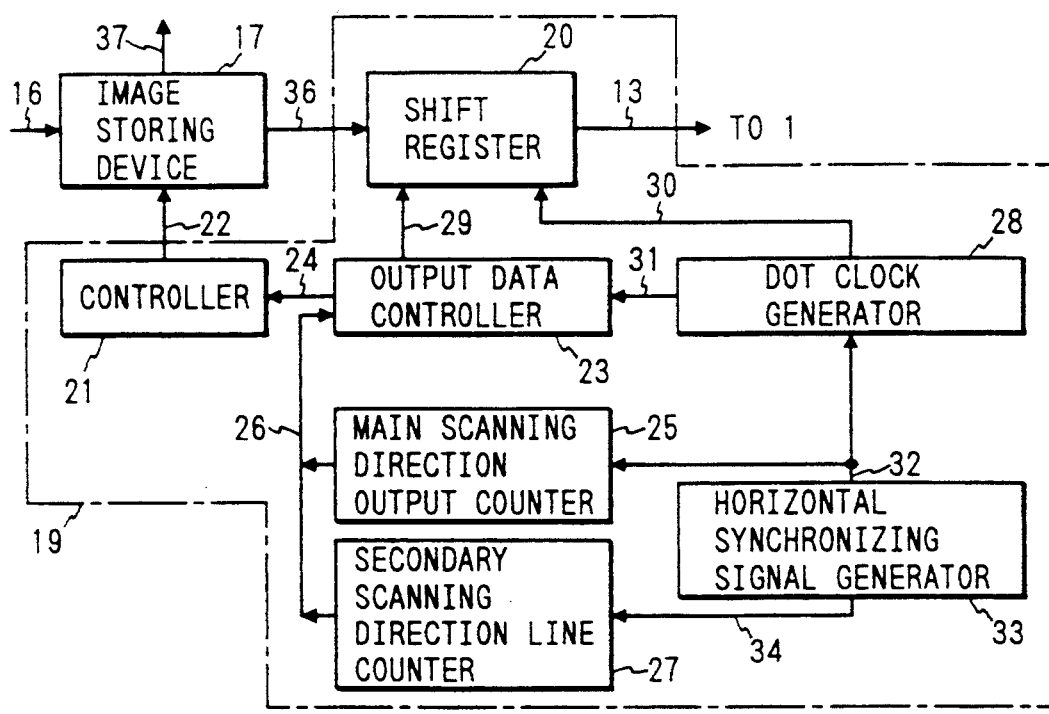
FIG. 3 is a block diagram showing an arrangement of an image data synchronous output circuit of the FIG. 2 circuit arrangement.

FIG. 2 is a block diagram showing a circuit arrangement for generating the image data to be supplied to the laser drive section 1 shown in FIG. 1. In FIG. 2, the image data synchronous output circuit 19 reads out image data from an image storing device 17 in synchronism with the output operation of the laser printer and supples the image data through the line 13 to the laser drive section 1. FIG. 3 shows a detailed arrangement of the image data synchronous output circuit 19. In FIG. 3, numeral 20 designates a shift register, 21 represents an image storing device data controller, 23 denotes an output data controller, 25 depicts a counter for counting the number of outputs in the main scanning direction, 27 indicates a counter for counting the number of lines in a secondary scanning direction, 28 represents a dot clock generator, and 33 designates a horizontal synchronizing signal generating section. Among these parts there are provided connecting lines 13, 22, 24, 26, 29, 30 to 32, 34 and 36.

The image data is supplied from the image storing device 17 through the line 36 to the shift register 20 of the image data synchronous output circuit 19. The image storing device 17 is coupled to the data controller 21 through the line 22 so as to store raster image data, supplied from a raster image data producing section 15 (see FIG. 2), or supply the raster image data through the line 36 to the shift register 20 in accordance with the control operation of the data controller 21. The shift register 20 of the image data synchronous output circuit 19 successively supplies the image data, to be recorded, to the laser drive section 1 through the line 13 in accordance with a control signal supplied from the output data controller 23 through the line 29 and further in accordance with a clock signal supplied from the dot clock generator 28 through the line 30. Here, although in the FIG. 2 circuit arrangement the image data produced by the raster image data producing section 15 is supplied to the image data synchronous output circuit 19 after passing through the image storing device 17, it is also appropriate that the image data is directly supplied from the raster image data producing section 15 to the image data synchronous output circuit 19.

The aforementioned raster image data producing section 15 has a function to output character and image data given through a line 14 thereto so as to be recorded as characters and images by the main scanning operation and the secondary scanning operation using a light spot in the laser printer. For example, as the raster image data producing section 15 there is used a hardware RIP which is a circuit to develop the page describing language (postscript or the like), a mesh spot producing circuit which is generally referred to as a dot generator, or a software. It is also appropriate to use a scanner (an image reader) as the raster image data producing section 15. Further, as the image storing device 17 there is used a storage such as a fixed disk (hard disk), photomagnetic disk and semiconductor disk.

As described above, since the image data to be recorded is arranged to be supplied to the laser printer through the image storing device 17, it is also possible to treat the page describing language-based image data which is not suitable in directly outputting to the laser printer, and since the image storing device 17 intervenes between the input image data and the output image data, it is allowable that the input and output image data are different in transmission rate from each other or they are not in synchronizing relation to each other. For example, in the case of recording an image signal outputted from the scanner, the output image data from the scanner is not required to be in synchronizing relation to the recording image data, that is, they are operable at different timings and different operating speeds. Moreover, since the image data to be recorded is supplied to the laser printer after passing through the image storing device 17, in the case that the laser printer outputs a plurality of same images, the outputting of the plurality of same data can be achieved with the same image data stored in the image storing device 17 being repeatedly read plural times to be supplied to the laser printer. Accordingly, unlike the case of no provision of the image storing device 17, it is not required that the raster image data producing section 15 generates the same image data plural times. In addition, it is possible to easily monitor the contents of the image with the image being supplied from the image storing device 17 through a line 37 to an image monitor (liquid crystal display or cathode ray tube) 18 as illustrated in FIG. 2, thereby preventing the image data from being outputted in error.

Figure 4:
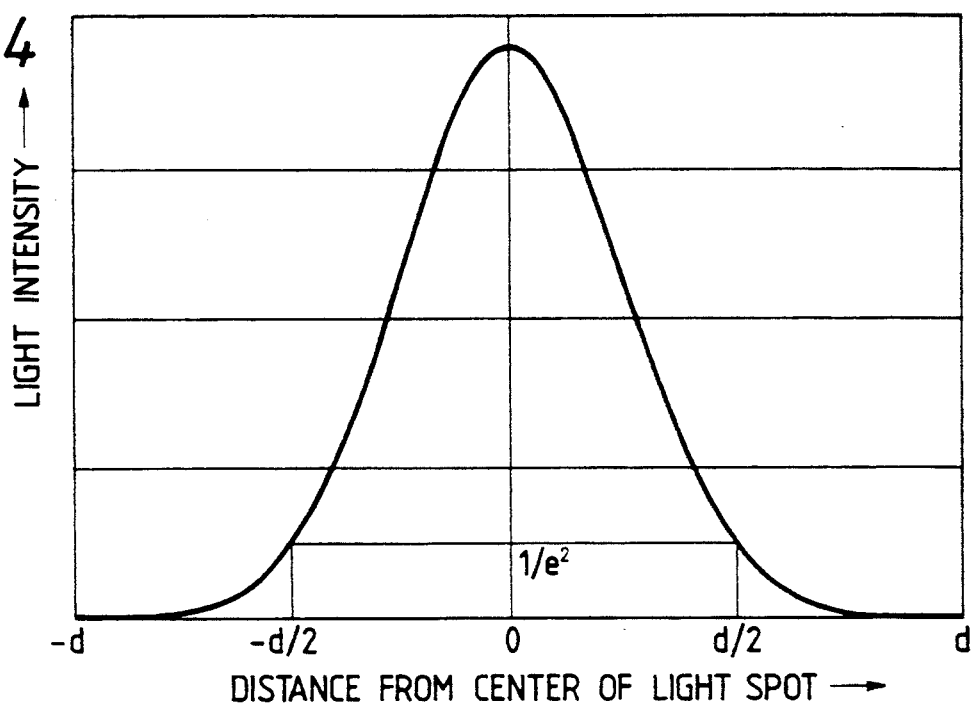
FIG. 4 is a graphic illustration for describing a light intensity distribution of a laser light beam.

Returning again to FIG. 1, the lighting operation of the semiconductor laser 2 is controlled by the laser drive section 1 in accordance with the image data supplied from the image data synchronous output circuit 19. The laser light emitted from the semiconductor 2 is condensed by the condensing lens 6 to form a light spot having a microscopic diameter on the photosensitive drum 7. As shown in FIG. 4, the light-intensity distribution in the light-condensed spot (light spot) on the photosensitive drum 7 shows a well-known Gaussian distribution, and the diameter of the light-condensed spot is indicated by the distance between the center position 0 of the light-condensed spot and the positions separated by $\pm d/2$ therefrom. Here, in the case that an image is recorded on a recording medium by the light-condensed spot with a diameter d formed by binary-varying the intensity of the laser light in accordance with the image data to be recorded, as illustrated in FIG. 4, by using the light spot having the diameter d which is $1/e^2$, it is possible to record a recording dot having a diameter greater than the diameter d of the light spot or record a recording dot having a diameter smaller than the diameter d thereof. That is, the diameter of the recording dot to be formed can be realized by satisfying specific conditions determined in connection with the development characteristic and photosensitive characteristic of the recording medium. For example, in the case of performing the recording by using silver salt photosensitive material, the aforementioned specific conditions depend upon the exposure amount and photosensitive characteristic of the silver salt photosensitive material, and in the case of performing the recording in accordance with the electrophotographic technique such as the Carlson method, the specific condition depends on the photosensitive characteristic of the photosensitive material, exposure amount, charging potential, development bias voltage and others.

In the case of forming the minimum recording dot having a diameter d on a recording medium by using the light spot having the diameter d in accordance with the Carlson method, when the laser light illumination is effected for the time that the light spot with the diameter d displaces by a distance d, the intensity of the laser light is generally adjusted so that the minimum recording dot having the diameter d is recorded on the recording medium.

Figure 5:
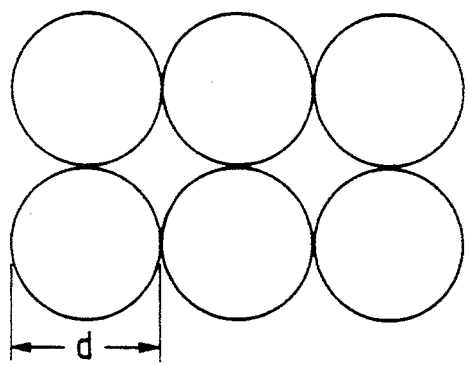
FIGS. 5 and 6 are plan views showing an exposure pattern to a photosensitive drum.
Figure 6:
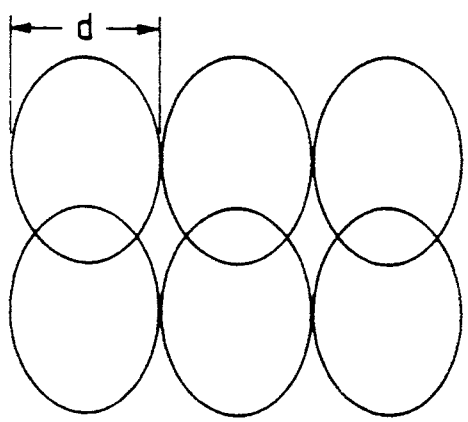

FIG. 5 is a plan view showing an exposure pattern due to the light spot having a circular cross section and having the diameter d. In FIG. 5, a plurality of circles indicate the positions of the light spot at the time of the exposure. Further, FIG. 6 is a plan view showing an exposure pattern where the diameter d of the cross section of the light spot in the main scanning direction is arranged to be smaller than the diameter of the same cross section in the secondary scanning direction so as to compensate for the exposure amount in the secondary scanning direction. In FIG. 6, similarly, a plurality of ellipses indicate the positions of the light spot at the time of the exposure.

Figure 7A:
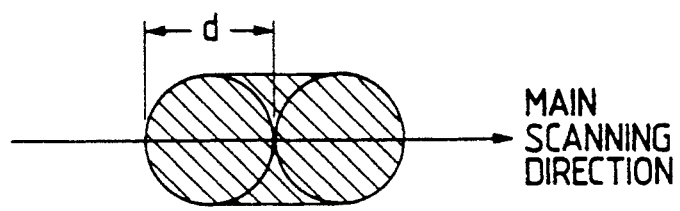
FIGS. 7A to 7D and 8A to 8D are illustrations for describing a recording state due to exposure by a light spot.
Figure 7B:
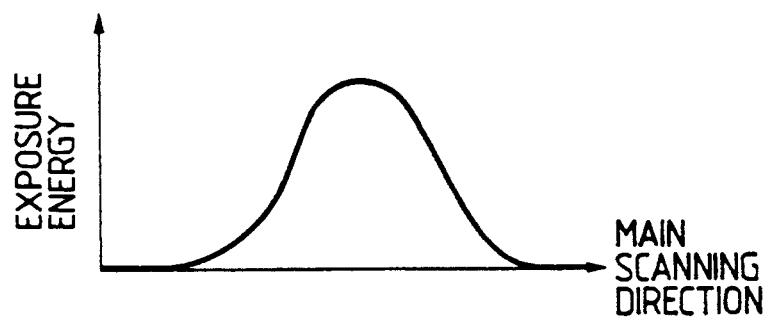
Figure 7C:
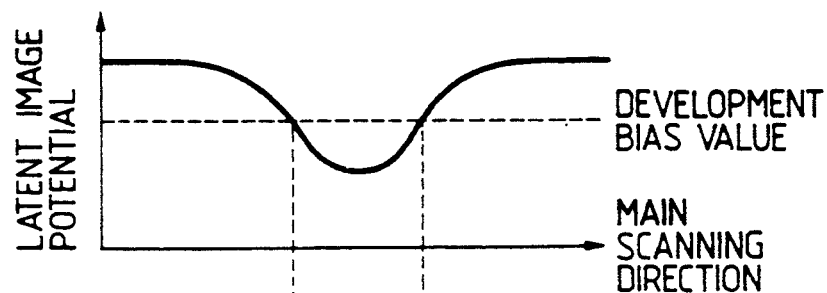
Figure 7D:
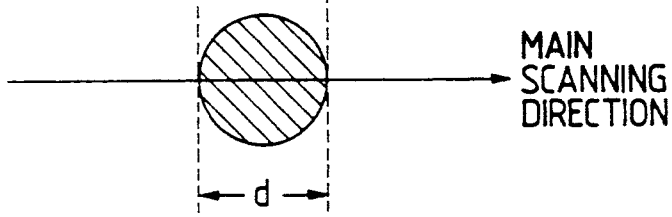
Figure 8A:
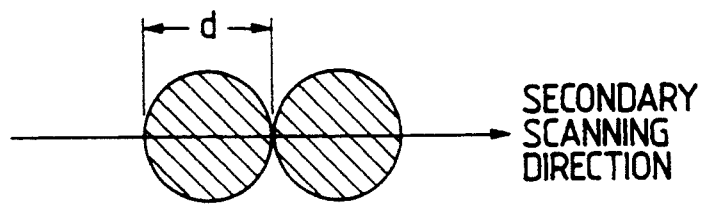
Figure 8B:
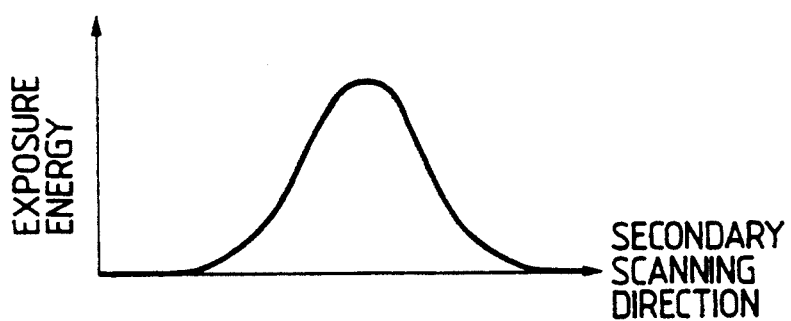
Figure 8C:
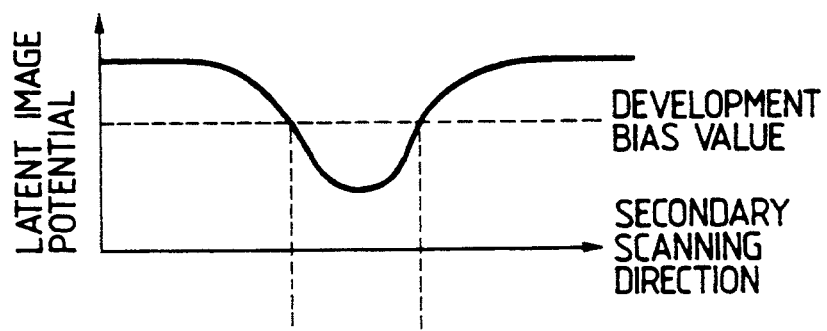
Figure 8D:
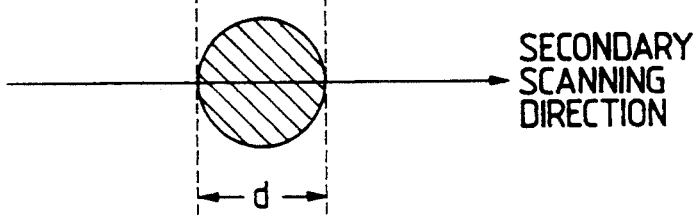

A detailed description will be made hereinbelow in terms of the embodiment of this invention. Here, for simplifying the description, the diameter of the recording dot is set to d ($=1/e^2$). Now, let it be assumed that the illumination of the photosensitive drum 7 is effected for the time that the light spot with the diameter d moves by the distance d in the main scanning direction. In this case, the light spot on the photosensitive drum 7 shifts from the position of the left side circle up to the right side circle as shown in FIG. 7A. At this time, the exposure energy given to the photosensitive drum 7 varies as illustrated in FIG. 7B. When such an exposure energy is given to the photosensitive drum 7, the surface potential of the photosensitive drum 7 varies in correspondence with the variation of the exposure energy, i.e., varies as illustrated in FIG. 7C. Further, If the development bias value is set as indicated in FIG. 7C, the corresponding toner image formed on the photosensitive drum 7 in accordance with the reverse developing technique or transferred from the photosensitive drum 7 onto a recording sheet has a circular configuration having a diameter of d as shown in FIG. 7D. FIGS. 8A to 8D show the case that the light spot moves in the secondary scanning direction.

As described above, in the case that the recording dot having the diameter d is formed on the recording medium by using the light spot having the same diameter d, if, under the condition that the illumination of the laser light is effected for the time taken when the light spot with the diameter d moves by the distance d, the recording condition such as the intensity of the laser light is determined so as to record the minimum recording dot having the diameter d on the recording medium, the minimum recording dot which can be recorded on the recording medium naturally has a diameter of d. For forming a recording dot having the above-mentioned diameter smaller than d with respect to the recording medium, it is common to change the arrangements of the optical system and others such as using light having a shorter wavelength and using a condensing lens having a greater numerical aperture. On the other hand, in the graduation reproduction method according to this invention, in the case of forming the minimum recording dot with the diameter d on the recording medium by means of the light spot having the diameter of d, with the recording conditions such as the intensity of the laser light being determined so that the minimum recording dot with the diameter d is recorded on the recording medium in the state that the exposure is effected by the laser light for the time necessary for the displacement of the light spot with the diameter d by the distance d, the recording image having a high resolution and good halftones can easily be formed without recording the recording dot whose minimum diameter is below d.

Figure 9:
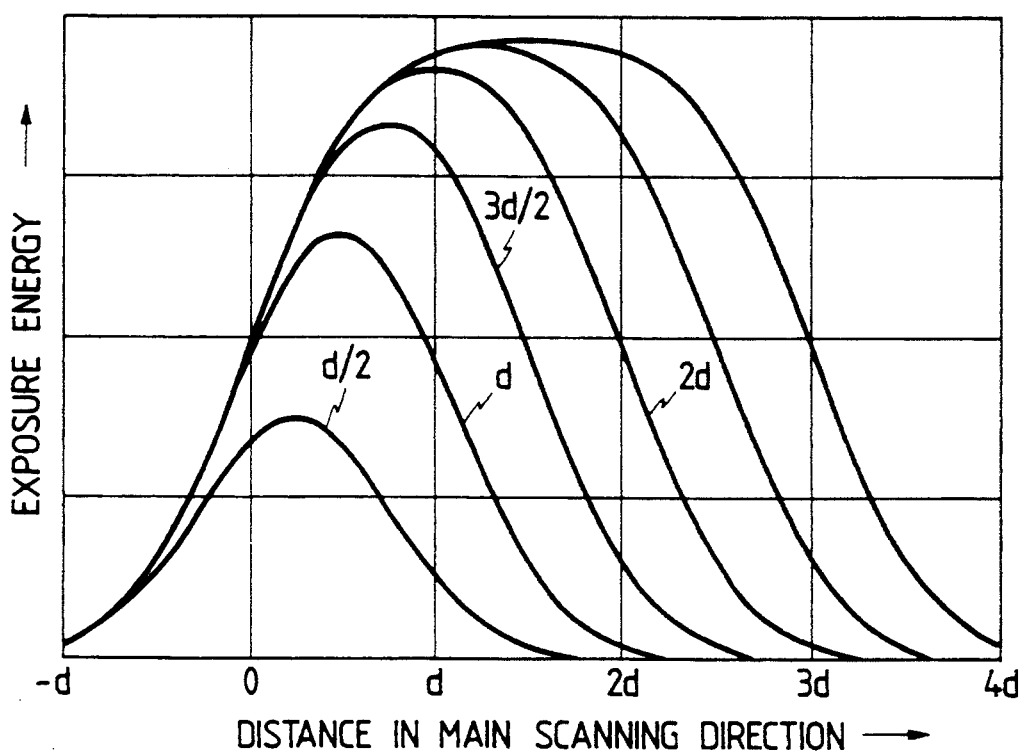
FIG. 9 is a graphic illustration for describing an exposure energy in the main scanning direction.
Figure 10:
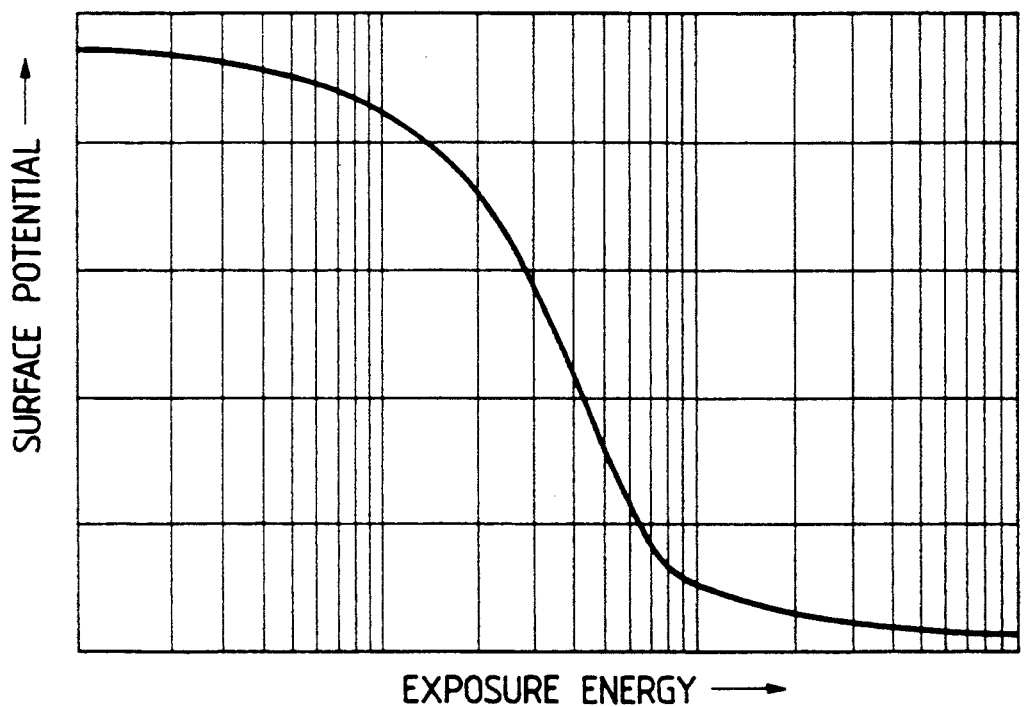
FIG. 10 is a graphic illustration for describing the relation between an exposure energy and a surface potential of a photosensitive drum.
Figure 11:
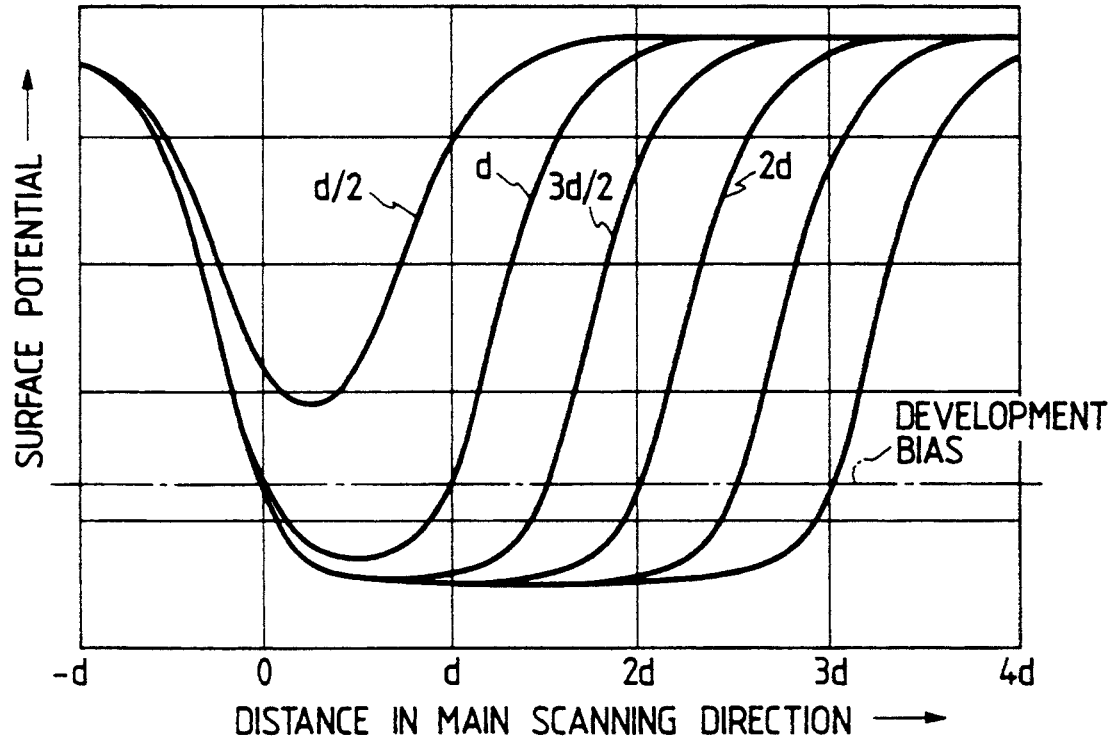
FIG. 11 is a graphic illustration for describing a surface potential of a photosensitive drum in the main scanning direction.
Figure 12:
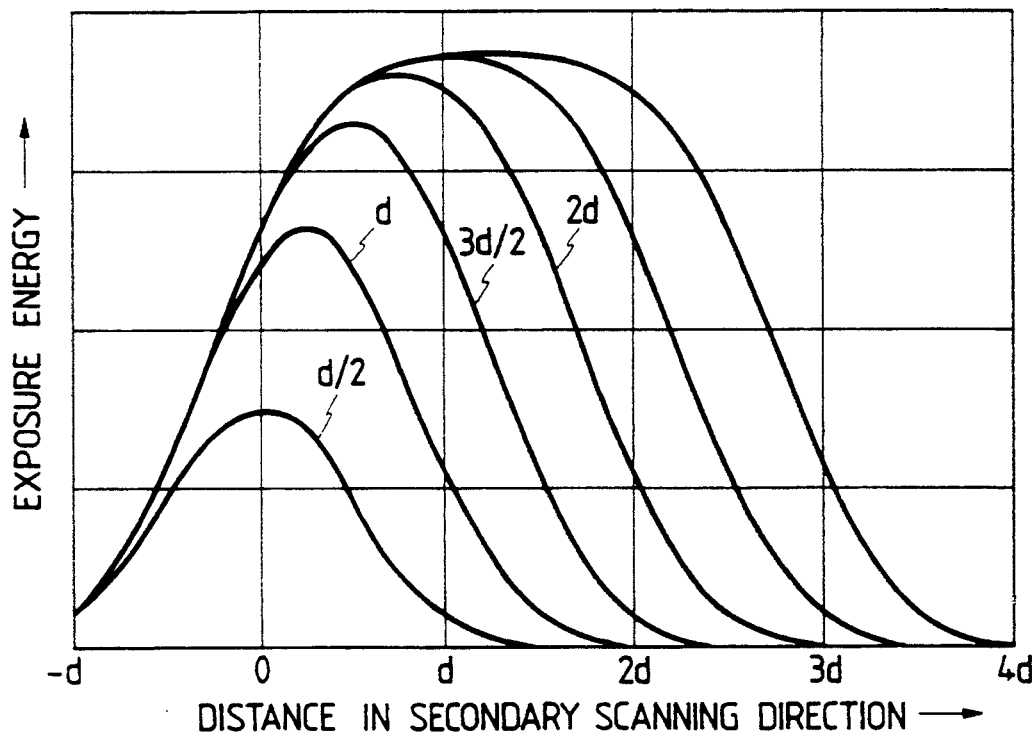
FIG. 12 is a graphic illustration for describing an exposure energy in the secondary scanning direction.
Figure 13:
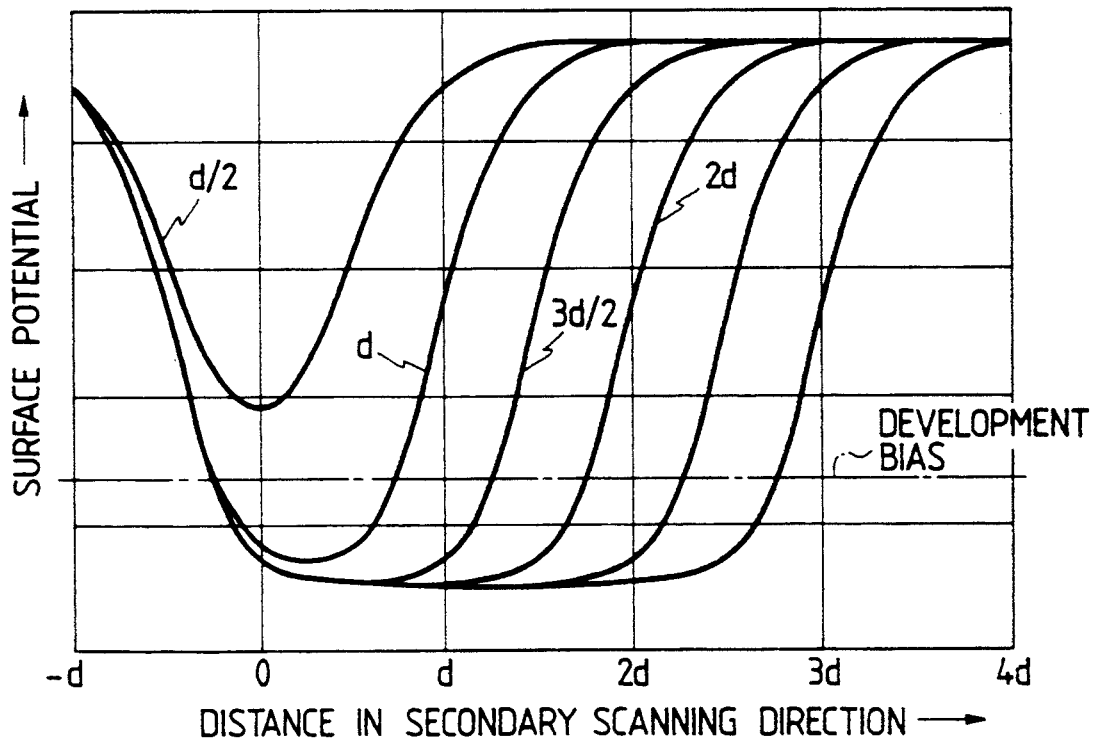
FIG. 13 is a graphic illustration for describing a surface potential of a photosensitive drum in the secondary scanning direction.

FIG. 9 shows exposure energy states in the case that the illumination of the laser light is effected for the times taken when the light spot with the diameter d is displaced by distances d/2, d, 3d/2, 2d . . . in the main scanning direction, and FIG. 12 shows exposure energy states in the case that the illumination of the laser light is effected for the times taken when the light spot with the diameter d is displaced by distances d/2, d, 3d/2, 2d ... in the secondary scanning direction. Further, FIG. 11 illustrates variation states of the surface potential of the photosensitive drum 7 in the case that the exposure energy as illustrated in FIG. 9 is given with respect to the photosensitive drum 7 having a characteristic (the relation between the exposure energy and the surface potential) as illustrated in FIG. 10, and FIG. 13 illustrates variation states of the surface potential of the photosensitive drum 7 in the case that the exposure energy as illustrated in FIG. 12 is given with respect to the photosensitive drum 7 having the characteristic (the relation between the exposure energy and the surface potential) as illustrated in FIG. 10.

As seen from the inverted S-shaped characteristic curve showing the relation between the exposure energy and the surface potential (FIG. 10), the surface potential of the photosensitive drum 7 does not greatly vary irrespective of the variation of the exposure energy at both the large exposure energy-given portion and small exposure energy-given portion, while the surface potential thereof greatly varies in response to slight variation of the exposure energy at the intermediate portion. Thus, the latter half portion of the inverted S-shaped characteristic curve is generally used in order to increase the contrast rate between the exposed portion and non-exposed portion on the photosensitive drum 7 and make sufficient the effective potential for the development. Here, if using the intermediate portion in the inverted S-shaped characteristic curve, the apparatus greatly depends upon variation of the condition due to variation of the environment in use, i.e., is easily affected by variation of the intensity of the laser light, variation of the charge sensitivity characteristic and others so as to be unstable. This requires an additional arrangement for correction.

Figure 16:
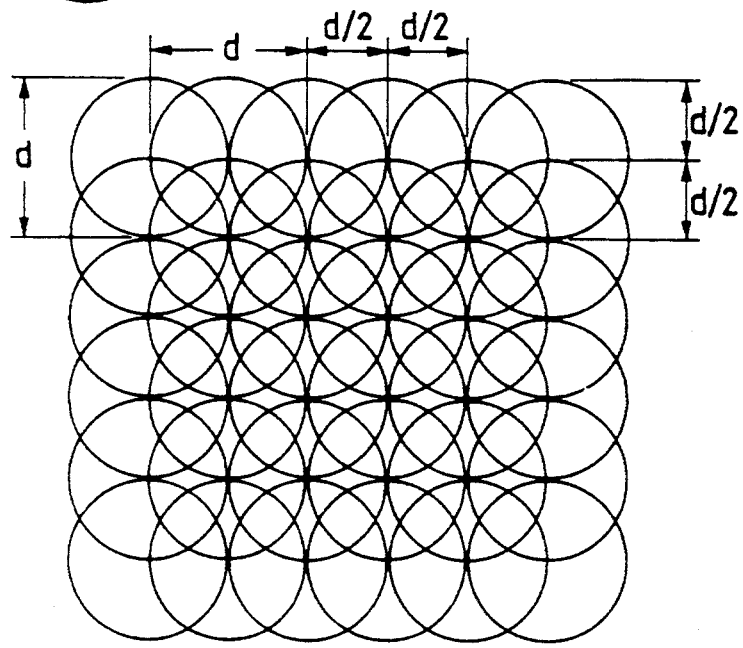
FIG. 16 is an illustration of an exposure pattern to be taken in this invention.
Figure 17A:
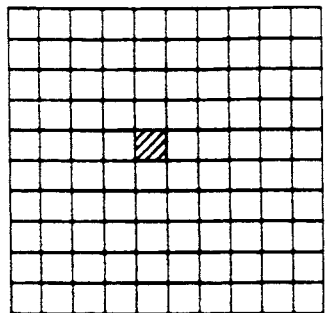
FIGS. 17(a)-(l) shows a graduation expression in a mesh spot.
Figure 17E:
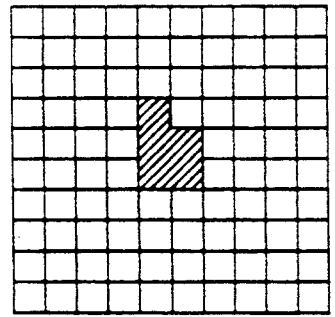
Figure 17I:
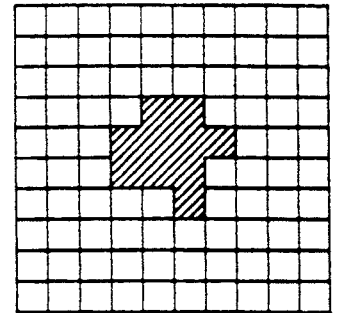
Figure 17B:
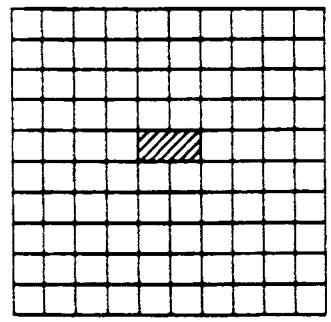
Figure 17F:
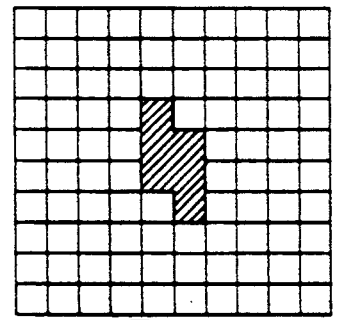
Figure 17J:
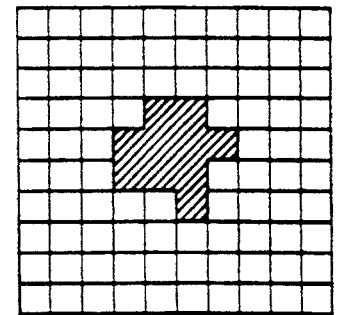
Figure 17C:
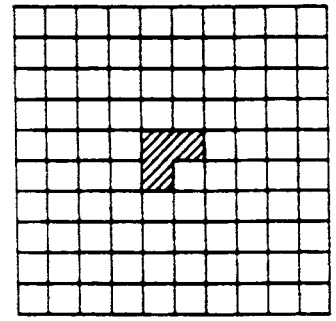
Figure 17G:
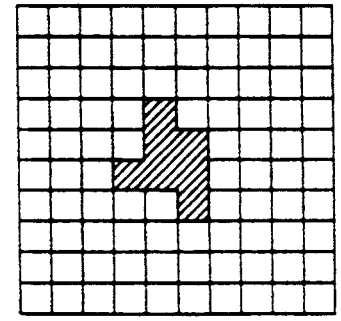
Figure 17K:
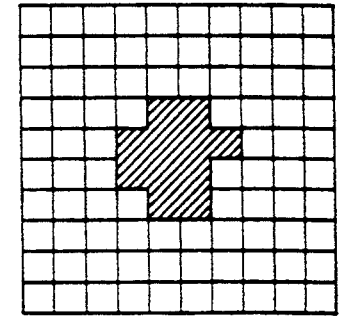
Figure 17D:
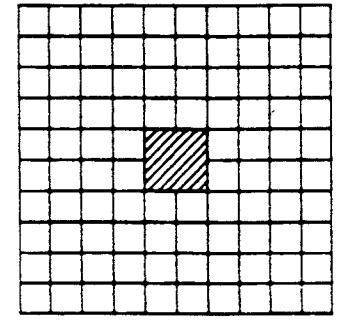
Figure 17H:
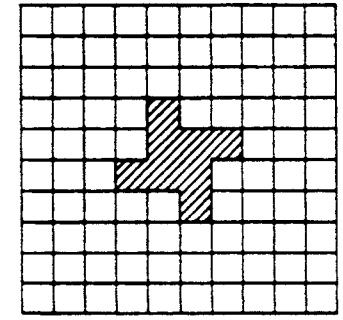
Figure 17L:
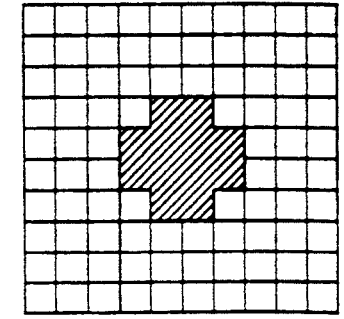

FIG. 16 shows an exposure pattern in the case that the laser light illumination is effected in units of the time taken when the light spot with the diameter d is moved by a distance d/2 in both the main and secondary scanning directions, where a number of circles indicate the positions of the light spot in the exposure. As seen from FIG. 16, the light spots at the respective positions are overlapped each other, whereby the excessive exposure occurs at the overlapping portions. For similarly forming the minimum recording dot with the diameter d at the portions, in which the excessive exposure occurs, by the light spot with the diameter d, the condition that the minimum recording dot with the diameter d is formed on the recording medium when the laser light illumination is effected for the time taken for the displacement of the light spot with the diameter d by the distance d is arranged to be applied as it is.

Although FIG. 16 shows the overlapped portions occurring when the light spot is moved by d/2 in both the main and secondary scanning directions, this invention is also applicable to the case that the overlapping state is different, that is, the case that the light spot is moved by d/N in the main scanning direction and moved by d/M in the secondary scanning direction. In effect, with the secondary scanning speed being lowered in correspondence with the rate of reduction of the illumination time relative to the normal illumination time determined under the recording condition set to record the minimum recording dot on the recording medium, it is possible to obtain a desired exposure pattern.

Figure 14:
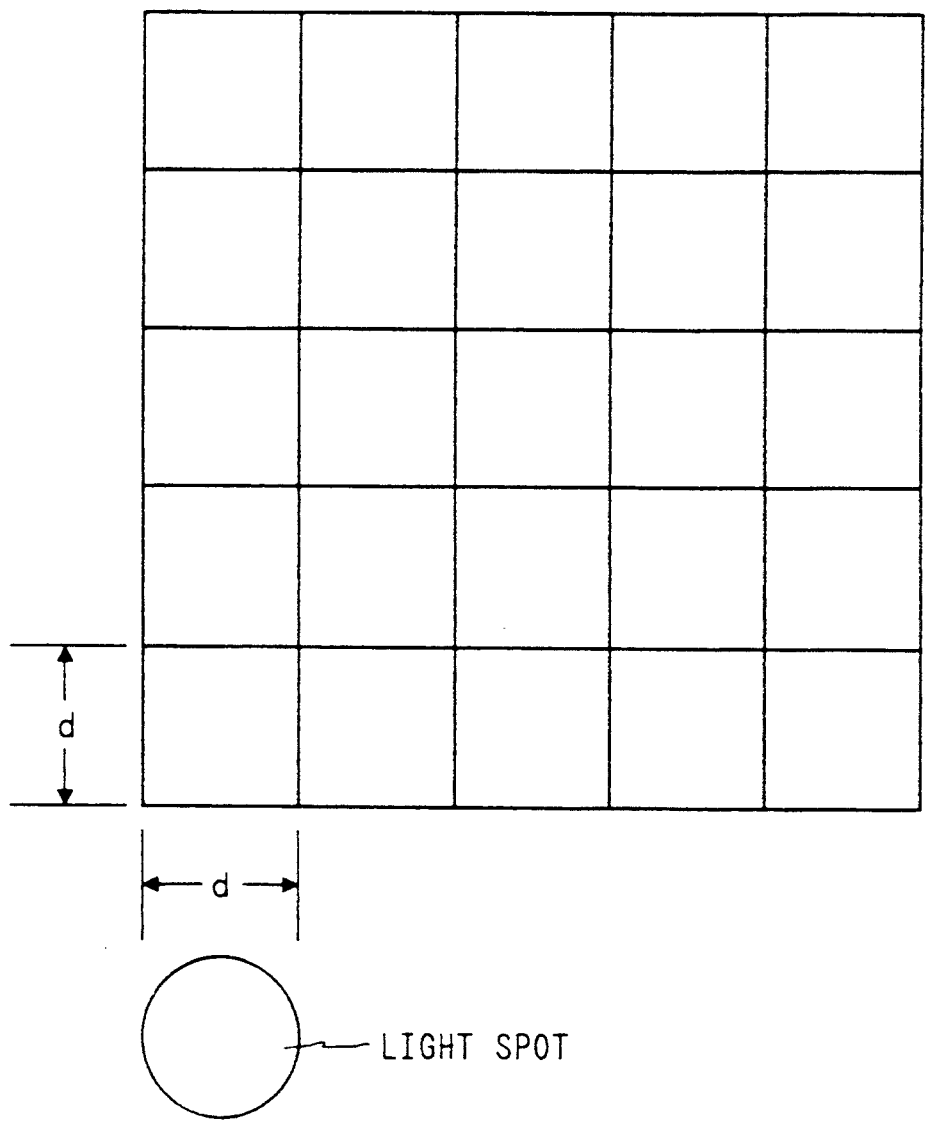
FIG. 14 is an illustration for describing a conventional graduation expression.
Figure 15:
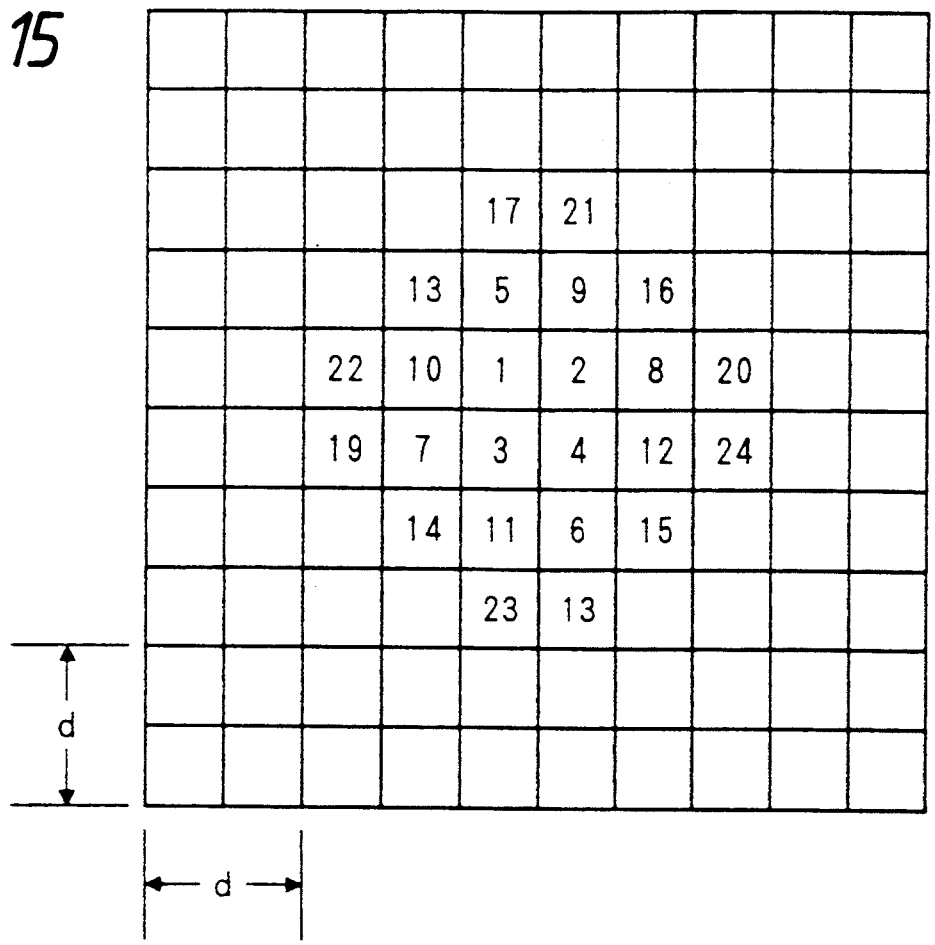
FIG. 15 is an illustration for describing a graduation expression according to this invention.
Figure 15:
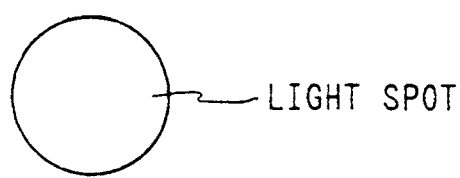

FIG. 14 is an illustration for describing a conventional graduation expression by a mesh spot (haftone cell). The mesh spot has a dimension in which one side is $5d$. The one side thereof is equally divided into 5 and the binary recording is performed by a light spot having a diameter d, thereby expressing 26 tones at this mesh spot. On the other hand, according to the graduation reproduction method of this invention, as exemplified by FIG. 15, in the case that the mesh spot similarly has a square having one side of $5d$ with respect to the light spot having the diameter d, for the graduation expression the one side thereof is equally divided into a greater number of portions whose dimension is smaller than the diameter d of the light spot. In FIG. 15, the one side of the mesh spot is divided equally into 10. In this case, 100 small blocks are formed in the same mesh spot, and hence 101 tones can be expressed by the binary recording to the 100 small blocks. Here, although in FIG. 15 the dimension of each small block of the mesh spot is arranged to be ½ of the diameter d of the light spot, this invention is not limited to this dimension. For example, the dimension of one side of each small block can be set to be a value obtained by dividing the diameter d of the light spot by an integer such as 2, 3, 4 and 5, or set to be a value other than 1/an integer of the diameter d of the light spot.

Figure 19:
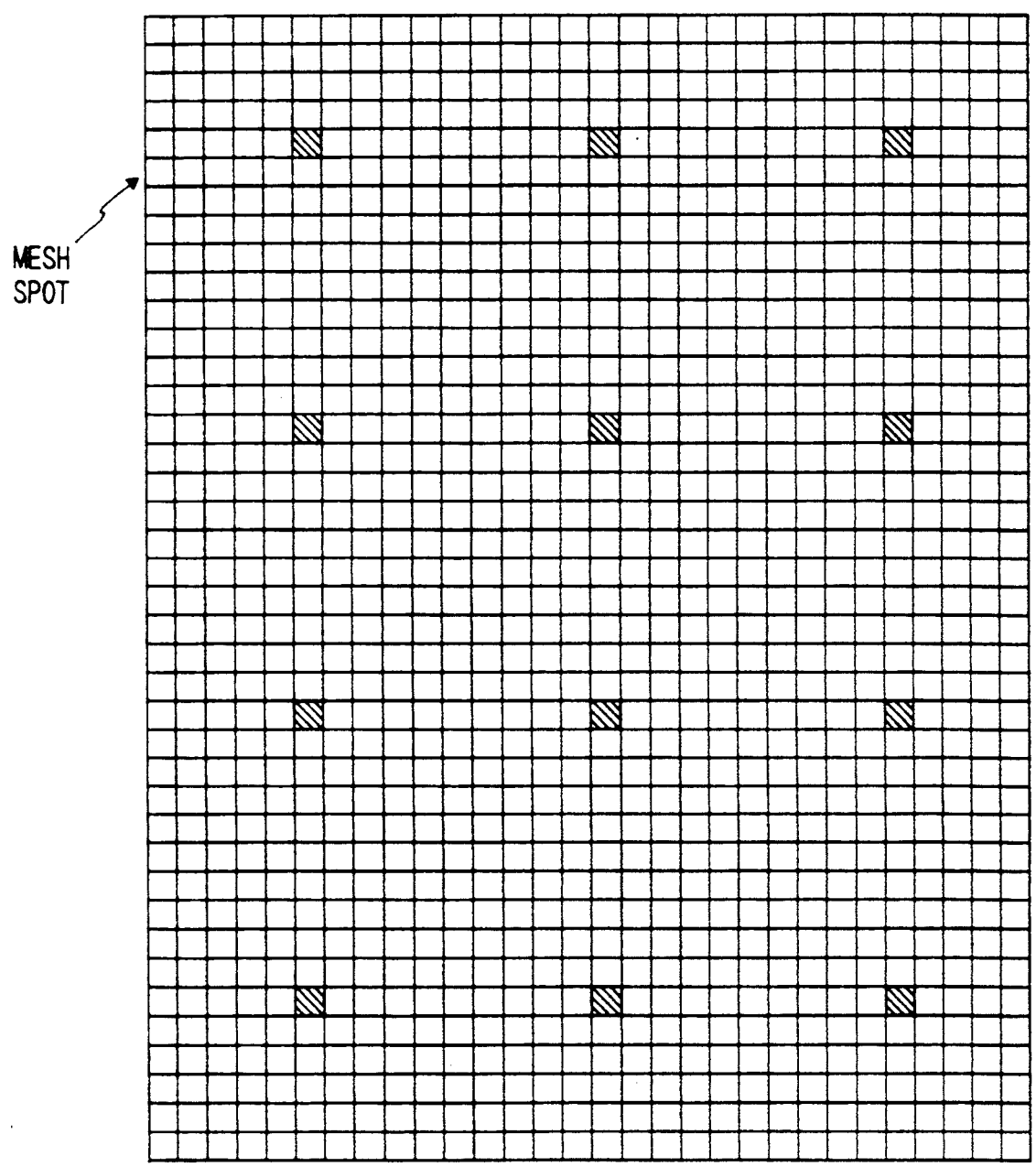
FIG. 19 is a plan view for describing a graduation expression in a mesh spot.

The graduation expression, being effected by the binary recording with respect to a number of small blocks in the mesh spot, is arranged to successively vary as illustrated in (a) to (l) of FIG. 17. The figures indicated in FIG. 15 show the order of the recording to be made with respect to the small blocks in the mesh spot in accordance with increase in the mesh spot % (screen percentage). Here, For the recording state being performed to successively vary in correspondence with the increase in the tone% as illustrated in (a) to (l) of FIG. 17, the formation of the recording dot is required to be made as illustrated in (a) of FIG. 17 even if the exposure energy is given by the light spot with the diameter d for the time taken for the above-mentioned movement by the distance d/2. FIG. 19 shows a state that the dot recording is effected in all the mesh spots as illustrated in (a) of FIG. 17, that is, shows an image which is expressed with a tone corresponding to the minimum mesh spot %.

In the case that the light-illumination time under the recording condition set to record the minimum recording dot on the recording medium is determined to be the time taken for moving the light spot with the diameter d by the distance d, when, for performing the development process and forming the toner image on the recording medium, the development bias as illustrated in FIGS. 11 and 13 is set with respect to the photosensitive drum 7 having a latent image which is formed by giving the exposure energy in units of the time that the light spot with the diameter d moves by the distance d/2 as illustrated in FIGS. 9 and 12, the portion which is exposed by the light spot over a time longer than the time for the movement by the distance d takes an appropriate state, while the portion in which a latent image is formed by performing the exposure only for the time for the movement of the light spot by the distance d/2 can take the non-imaged state or take an unstable state affected by various factors such as variation of the photosensitivity of the photosensitive material, fluctuation of the development bias, difference of the light intensity and variation of the illumination time. Accordingly, in the case of forming the recording dot under the above-described condition, the image with the tone of the minimum mesh spot % as shown in FIG. 19 cannot be appropriately obtained even if forming the recording dot in the mesh spot in the recording mode as illustrated in (a) of FIG. 17.

Figure 18:
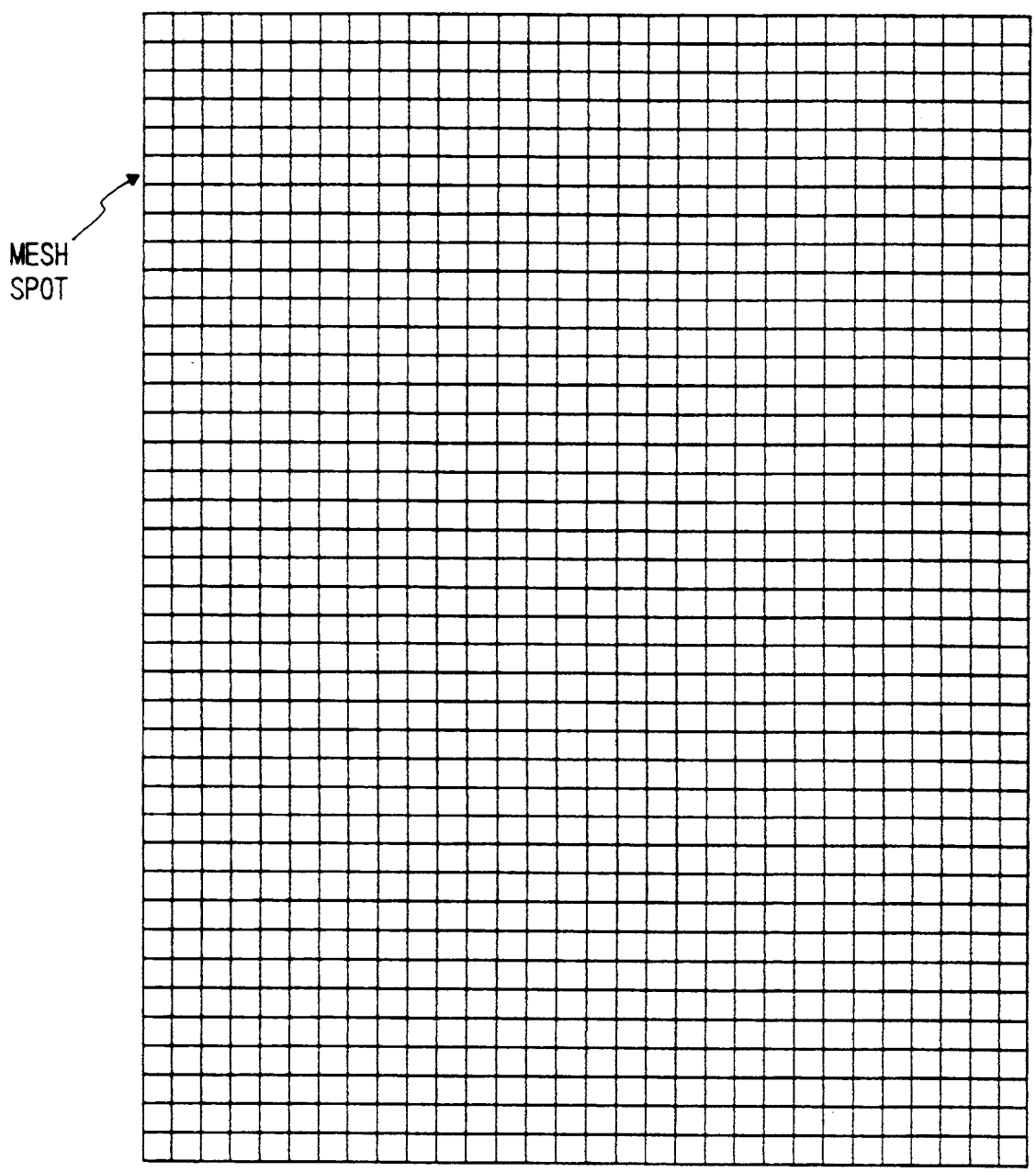
FIG. 18 is a plan view showing an arrangement of a mesh spot.
Figure 25:
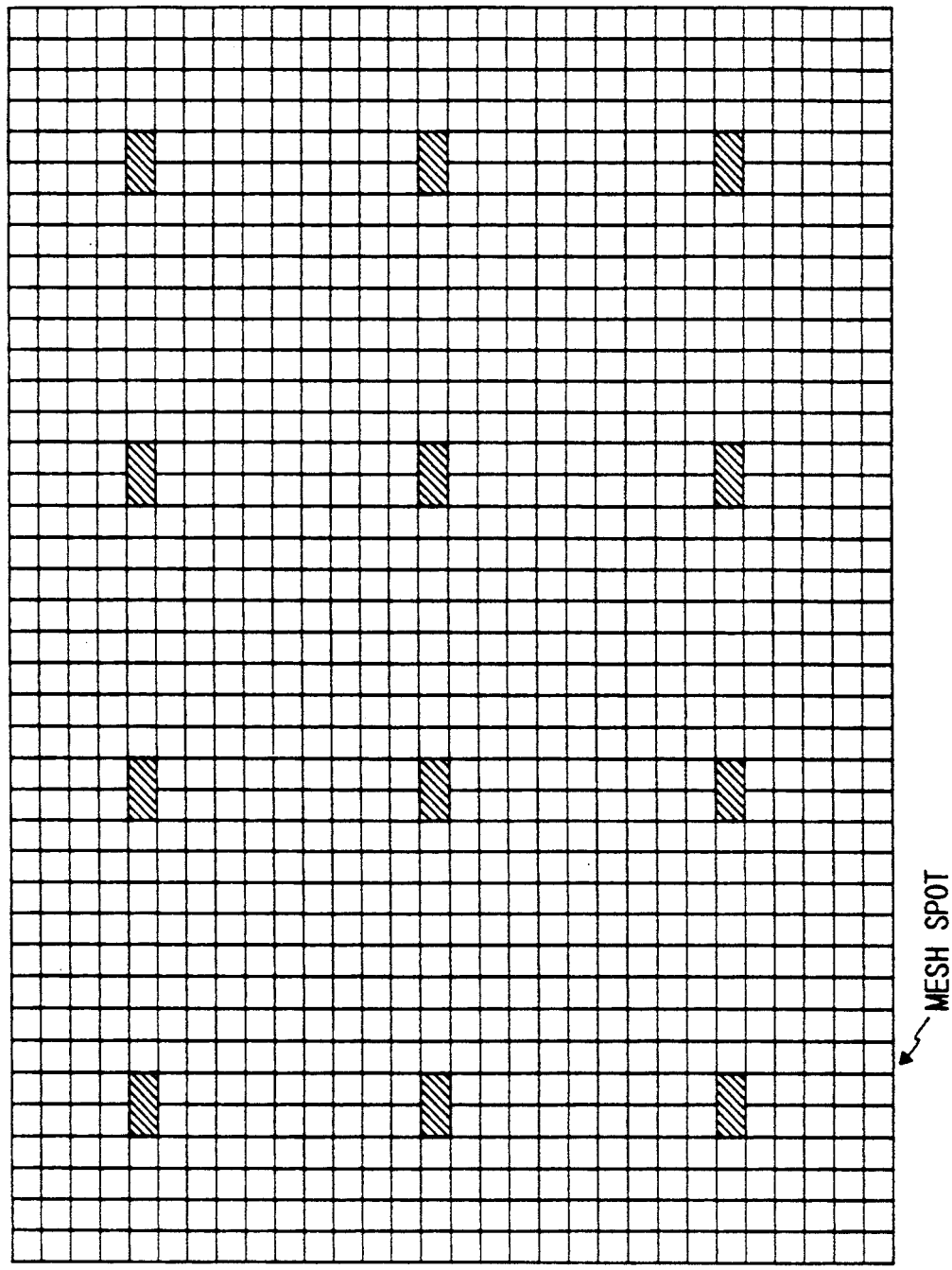
FIGS. 25 and 26 are plan views respectively showing graduation expressions in mesh spots.
Figure 26:
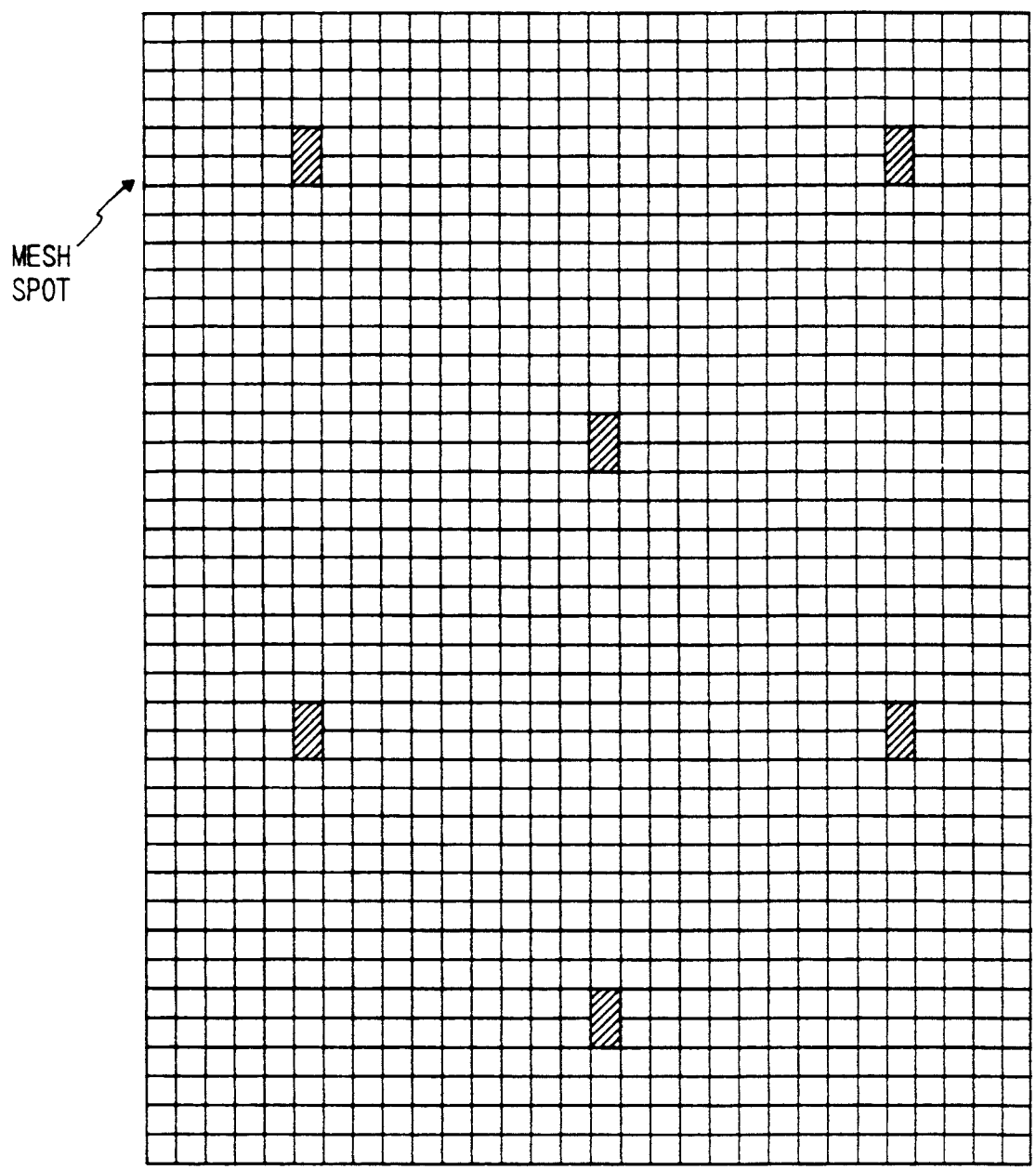

Thus, the graduation reproduction method according to this invention is arranged as follows:

1) In the case that the light beam is intensity-modulated on the basis of the digital image data from the image storing device or the like in accordance with the binary recording technique and the main scanning operation and secondary scanning operation are effected by the relative displacement between the light spot of the light beam and the member to which the light spot is projected so as to perform the halftone recording by the screen percentage due to the light spot of the light beam, the illumination time value reduced to a predetermined state with respect to the normal illumination time value determined under a recording condition set to record the minimum recording dot on the recording medium is set as a unit of the illumination time, and this unit illumination time is used as a unit illumination time at the time of the recording of the halftone due to the area tone and the secondary scanning speed is reduced in correspondence with the rate of reduction of the unit illumination time relative to the above-mentioned normal illumination time value, and in the case that the recording operation is the screen percentage to be effected by the light spot only for the unit illumination time, the exposure is arranged so as not to be performed by the light spot of the light beam, and further, in the case that the recording operation is the screen percentage to be effected by the light spot only for the unit illumination time, the minimum graduation expression is cut off, and in place of the minimum graduation expression, the image where the mesh spot % is 0% as illustrated in FIG. 18 is recorded;

2) In the case that the light beam is intensity-modulated on the basis of the digital image data from the image storing device or the like in accordance with the binary recording technique and the main scanning operation and secondary scanning operation are effected by the relative displacement between the light spot of the light beam and the member to which the light spot is projected so as to perform the halftone recording by the screen percentage due to the light spot of the light beam, the illumination time value reduced to a predetermined state with respect to the normal illumination time value determined under a recording condition set to record the minimum recording dot on the recording medium is set as a unit of the illumination time, and this unit illumination time is used as a unit illumination time at the time of the recording of the halftone due to the area tone and the secondary scanning speed is reduced in correspondence with the rate of reduction of the unit illumination time relative to the above-mentioned normal illumination time value, and in the case that the recording operation is the screen percentage to be effected by the light spot only for the unit illumination time, the exposure is arranged so as not to be performed by the light spot of the light beam, and further, in the case that the recording operation is the screen percentage to be effected by the light spot only for the unit illumination time, the minimum graduation expression is cut short, and in place of the minimum graduation expression, the image where the mesh spot % is greater than the minimum graduation expression as illustrated in FIG. 25 is recorded; and 3) In the case that the light beam is intensity-modulated on the basis of the digital image data from the image storing device or the like in accordance with the binary recording technique and the main scanning operation and secondary scanning operation are effected by the relative displacement between the light spot of the light beam and the member to which the light spot is projected so as to perform the halftone recording by the screen percentage due to the light spot of the light beam, the illumination time value reduced to a predetermined state with respect to the normal illumination time value determined under a recording condition set to record the minimum recording dot on the recording medium is set as a unit of the illumination time, and this unit illumination time is used as a unit illumination time at the time of the recording of the halftone due to the area tone and the secondary scanning speed is reduced in correspondence with the rate of reduction of the unit illumination time relative to the above-mentioned normal illumination time value, and in the case that the recording operation is the screen percentage to be effected by the light spot only for the unit illumination time, the exposure is performed with the light spot of the light beam for the normal illumination time value determined under the recording condition taken when recording the minimum recording dot on the recording medium, and in the case of the graduation expression due to the mesh spot in the development where the portion which has not been exposed by the light spot is developed as an image, the output interval of the minimum recording dots is widened so as to output a mesh spot % exceeding the mesh spot % determined in correspondence with the above-mentioned minimum recording dot, and in the case of the graduation expression due to the mesh spot in the development where the portion which has been exposed by the light spot is developed as an image, the output interval is widened so as to output a mesh spot % below the mesh spot % determined in correspondence with the above-mentioned minimum recording dot, whereby the recording as illustrated in FIG. 26 is performed so as to reproduce the minimum mesh % state.

Further, in the case of recording the halftone due to the screen percentage by the light spot of the light beam, for the image whose mesh spot % is 0% as illustrated in FIG. 18 being recorded when the exposure is effected in correspondence with the unit illumination time reduced to a predetermined state as compared with the normal illumination time value determined under the recording condition set to record the minimum recording dot on the recording medium, the image data synchronous output circuit 19 shown in FIG. 1 is required to supply the laser drive section 1 with the image data which can provide the recording mode as illustrated in FIG. 18. Thus, in a known mesh spot producing circuit of the raster image producing section 15 shown in FIG. 2, the image data determined to record the image of the recording mode as shown in FIG. 19

Figure 20:
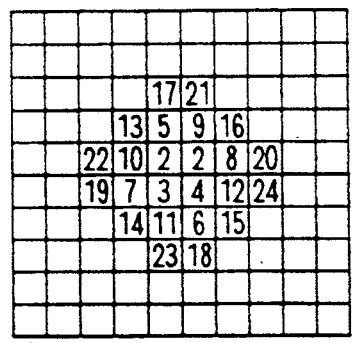
FIGS. 20 to 24 are plan views showing examples of screen pattern data.

(for example) is compared with, for example, a screen pattern data as illustrated in FIG. 20 so as to be converted into the image data, which can form the image of the recording mode as shown in FIG. 18, and supplied to the image storing device 17.

FIG. 20 is a plan view showing an example of screen pattern data to be used in converting the image data for recording the FIG. 19 recording mode image into the image data for recording the FIG. 18 recording mode image. In FIG. 20, the mesh spot is indicated by a large-line frame and the small blocks are a number of portions partitioned by small lines. The figures representatively written in the small blocks are given in correspondence with the tone of the recording image. For example, when the tone of the recording image is 3, the recording dots are formed in the respective small blocks in which the FIGS. 3 and 2 are written, and when the tone thereof is 9, the recording dots are formed in the respective small blocks in which the FIGS. 9, 8, 7, 6, 5, 4, 3 and 2 are written. That is, the recording dot is formed in the small block having the figure equal to the figure of the recording image tone and further formed in the small blocks having figures below the figure of the recording image tone (this is similar to the cases of FIGS. 21 to 24 which will be described hereinafter).

Figure 24:
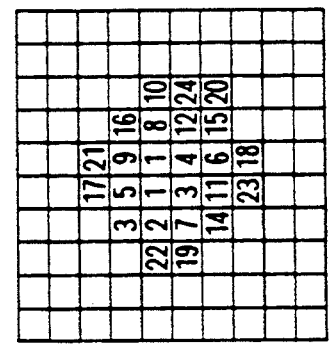

In the case of recording the halftone according to the screen percentage and in the case of performing the exposure corresponding to the unit illumination time which is reduced to a predetermined state with respect to the normal illumination time value set to record the minimum recording dot on the recording medium, for recording the image as shown in FIG. 25, the image data synchronous output circuit 19 shown in FIG. 2 is required to supply the laser drive section 1 shown in FIG. 2 with the image data Which can take the recording mode as illustrated in FIG. 25, and hence, in the mesh spot producing circuit of the raster image data producing section 15 in FIG. 2, the image data determined to record, for example, the FIG. 19 recording mode image is compared with, for example, the FIG. 24 screen pattern data so as to be converted into the image data which can record the FIG. 25 recording mode image, then supplied to the image storing device 17. Further, in the case that in the mesh spot producing circuit of the raster image producing section 15 it is compared with a screen pattern data shown in FIG. 24 for the conversion, since the FIG. 24 screen pattern data has two data each of which can form the recording dot in the small block of the mesh spot in correspondence with the tone 1, when the image data determined to record, for example, the FIG. 19 recording mode image is supplied to the raster image data producing section 15, the raster image data producing section 15 outputs the image data, which can record the FIG. 25 recording mode image, through the image storing device 17 and the image data synchronous output circuit 19 to the laser drive section 1 or output it through only the image data synchronous output circuit 19 to the laser drive section 1 without passing through the image storing device 17, thereby recording the FIG. 25 recording mode image.

Figure 21:
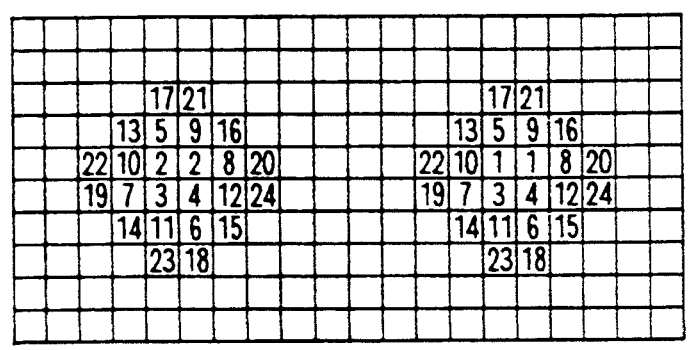

Moreover, in the case of performing the recording of the halftone by the screen percentage and performing the exposure corresponding to the unit illumination time reduced to a predetermined state with respect to the normal illumination time determined under the recording condition set to record the minimum recording dot on the recording medium, in order for recording the image with the minimum mesh spot % by the recording dot arrangement for the recording mode, for example, as illustrated in FIG. 26, the image data synchronous output circuit 19 is required to supply the laser drive section 1 with the image data which allows the FIG. 26 recording mode, and hence, in the mesh spot producing circuit of the raster image data producing section 15 the image data determined to record, for example, the FIG. 19 recording mode image is compared with, for example, a screen pattern data as illustrated in FIG. 21 so as to be converted into the image data, which can record the FIG. 26 recording mode image, before being supplied to the image storing device 17.

Although in FIG. 26 the small block formed in the mesh spot is a square and has a dimension of one side which is ½ of the diameter d of the light spot for the exposure as well as the case shown in FIG. 15, in this invention the dimension of each small block in the mesh spot can optionally be set as described above. The raster image data producing section 15 appropriately changes, in accordance with the dimension of the each small block set, the rate of thinning-out of the mesh spot in recording the minimum recording dot by performing the exposure for the normal illumination time determined under the recording condition taken for recording the minimum recording dot. Accordingly, regardless of the dimension of the small block within the mesh spot, it is possible to obtain the image formed in accordance with the substantial adequate mesh spot %.

Figure 22:
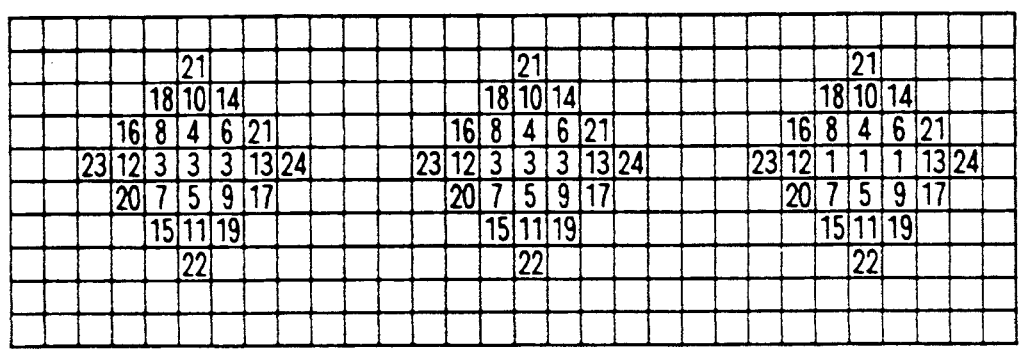
Figure 23:
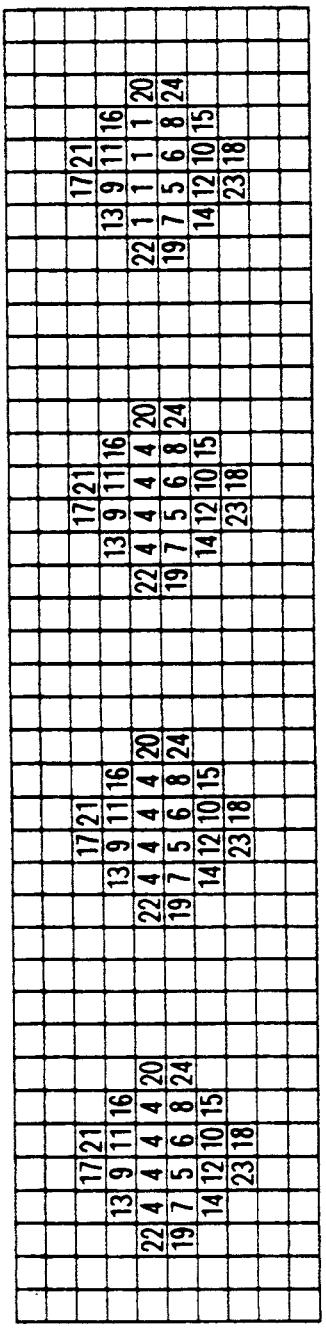

FIG. 22 is an illustration of screen pattern data to be used in the raster image data producing section 15 when the dimension of one side of each small block in the mesh spot is ⅓ of the diameter d of the exposure light spot, and FIG. 23 is an illustration of screen pattern data to be used in the raster image data producing section 15 when the dimension of one side of each small block thereof is ¼ of the diameter d of the exposure light spot. Here, predetermined image data are produced in accordance with the development method such as the positive development method and the reversal development method.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A gradation reproduction method of performing halftone recording due to screen percentage by a light spot of a light beam with said light beam being intensity-modulated on the basis of digital image data in accordance with a binary recording technique and main and secondary scanning operations due to said light spot being effected with respect to a photosensitive member, wherein an illumination time value reduced with respect to a normal illumination time value determined under a recording condition set to record a minimum recording dot on a recording medium is set as a unit of illumination time and said reduced illumination time value is further used as a unit illumination time at the time of the recording of said halftone due to said screen percentage, and a speed of said secondary scanning operation is reduced in correspondence with the rate of reduction of said unit illumination time relative to said normal illumination time value, and, when the recording is said screen percentage to be effected by said light spot for said unit illumination time, said photosensitive member is exposed to said light spot for said normal illumination time.

2. A method of reproducing tonal graduation in optical recording, comprising the steps of:

modulating an intensity of a light beam in response to digital image data;

applying the light beam to a photosensitive member and forming a spot of the light beam on the photosensitive member;

scanning the photosensitive member by the spot of the light beam;

setting a unit illumination time shorter than a predetermined normal illumination time required for illuminating the photosensitive member with the spot of the light beam to record a predetermined minimum dot thereon;

determining a desired illumination time for illuminating the photosensitive member with the spot of the light beam;

varying the desired illumination time for recording a variable halftone in response to the spot of the light beam on the photosensitive member according to a variable screen percentage;

using the unit illumination time as a unit in said step of varying the desired illumination time;

holding the photosensitive member actually illuminated with the spot of the light beam during the desired illumination time when the desired illumination time is longer than the normal illumination time; and preventing the photosensitive member from being illuminated with the spot of the light beam when the desired illumination time is equal to or shorter than the normal illumination time.

3. The method of claim 2, wherein said step of scanning comprises scanning the photosensitive member at predetermined scanning speeds in main- and sub-scanning directions, and further comprising the step of decreasing said scanning speed in said sub-scanning direction in response to a rate of reduction of the unit illumination time relative to the normal illumination time.

4. The method of claim 2, wherein said step of setting a unit illumination time comprises setting the unit illumination time shorter than a predetermined illumination time required for illuminating the photosensitive member with the spot of the light beam to record thereon a dot having a diameter substantially equal to a diameter of the spot of the light beam.

5. A method of reproducing tonal graduation in optical recording, comprising the steps of:

modulating an intensity of a light beam in response to digital image data;

applying the light beam to a photosensitive member and forming a spot of the light beam on the photosensitive member;

scanning the photosensitive member by the spot of the light beam;

setting a unit illumination time shorter than a predetermined normal illumination time during which the photosensitive member should remain illuminated with the spot of the light beam to record a predetermined minimum dot;

determining a desired illumination time during which the photosensitive member should remain illuminated with the spot of the light beam;

varying the desired illumination time to record a variable halftone in response to the spot of the light beam on the photosensitive member according to a variable screen percentage;

using the unit illumination time as a unit in said varying the desired illumination time;

holding the photosensitive member actually illuminated with the spot of the light beam during the desired illumination time in cases where the desired illumination time is longer than the normal illumination time; and holding the photosensitive member actually illuminated with the spot of the light beam during the normal illumination time in cases where the desired illumination time is equal to or shorter than the normal illumination time.

6. The method of claim 5, wherein said step of scanning comprises scanning the photosensitive member at predetermined scanning speeds in main- and sub-scanning directions, and further comprising the step of decreasing said scanning speed in said sub-scanning direction in response to a rate of reduction of the unit illumination time relative to the normal illumination time.

7. The method of claim 5, further comprising the step of expanding intervals between screen output dots in response to the screen percentage to attain a correct halftone in cases where the desired illumination time is equal to or shorter than the normal illumination time.

8. The method of claim 5, wherein said step of setting a unit illumination time comprises setting the unit illumination time shorter than a predetermined illumination time required for illuminating the photosensitive member with the spot of the light beam to record thereon a dot having a diameter substantially equal to a diameter of the spot of the light beam.

* * * * *